Sept. 1, 1925.
A. I. KAPLON
1,551,570
BRAKING DEVICE FOR VEHICLES
Filed April 3, 1924
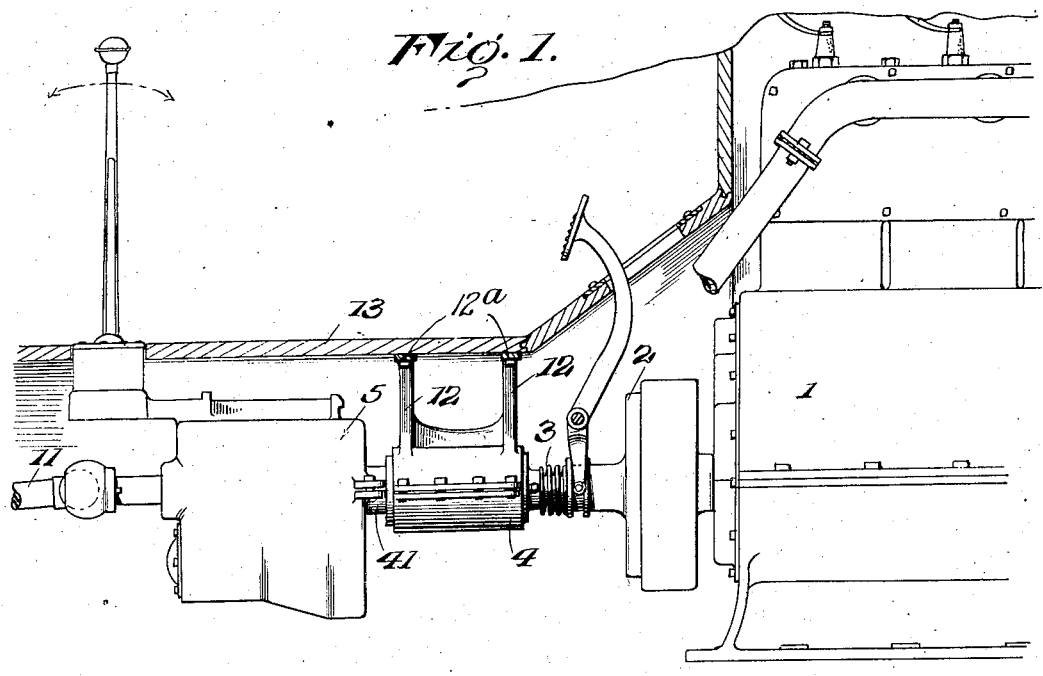
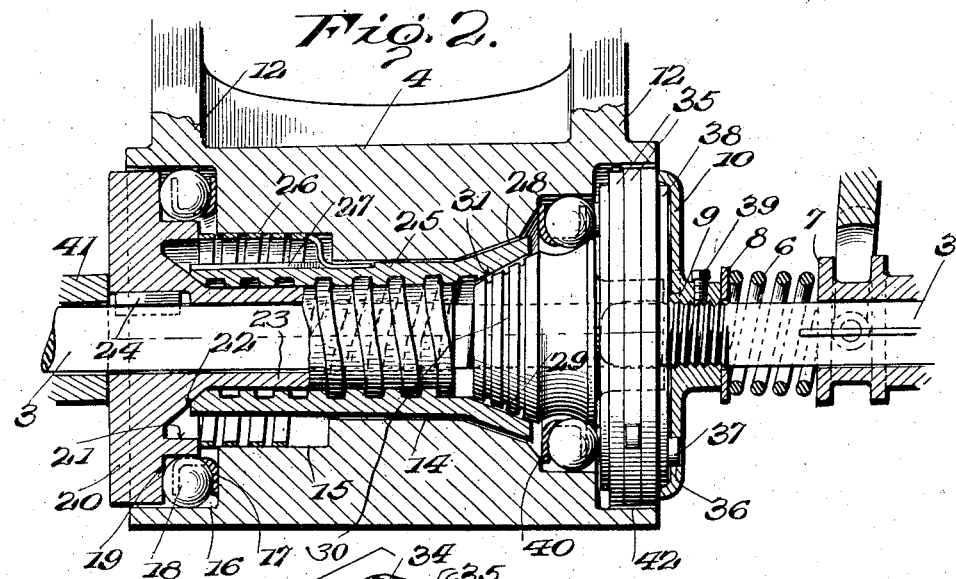
WITNESS
W. A. Williams
INVENTOR
Abraham I. Kaplon
BY
ATTORNEYS Patented Sept. 1, 1925.

1,551,570

UNITED STATES PATENT OFFICE.

ABRAHAM ISAAC KAPLON, OF BRUNSWICK, MARYLAND.

BRAKING DEVICE FOR VEHICLES.

Application filed April 3, 1924. Serial No. 704,021.

*To all whom it may concern:*

Be it known that I, ABRAHAM ISAAC KAPLON, a citizen of the United States, and a resident of Brunswick, in the county of Frederick and State of Maryland, have invented certain new and useful Improvements in Braking Devices for Vehicles, of which the following is a specification.

This invention relates to braking devices for vehicles.

An object of the invention is the provision of a device which will be actuated automatically to prevent the drive shaft from being rotated by the rear wheels at all times when an ascending automobile is stalled on a hill and thus preventing the automobile from travelling backward.

A further object of the invention is the provision of a device employed in connection with the drive shaft of the engine of an automobile and located between the engine and the transmission and adapted to be actuated automatically for preventing anti-clockwise rotation of said shaft by the rear wheels of an automobile when the automobile begins to travel backward down a hill.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 shows a longitudinal view of an engine, the transmission and my braking device in operative position.

Figure 2 is a longitudinal section of my braking device.

Figure 3 is a view in perspective of the clutch mechanism of the braking device.

Referring more particularly to the drawings, 1 designates an engine having a clutch mechanism 2 which connects the engine shaft with shaft 3 which extends through the automatic braking casing 4 and projects into the transmission casing 5.

A spring 6 on the shaft 3 engages at one end the grooved collar 7 while the other end of the spring engages a washer 8 held in place by the internally threaded collar 9 formed integrally with a disc 10.

Projecting from the rear end of the transmission casing is a driven shaft 11 which may be rotated clockwise or anti-clockwise depending upon the direction in which the automobile is travelling, while the shaft 3 and the engine shaft always are rotated in a clockwise direction. The fact that the engine shaft and shaft 3 are always rotated in a clockwise direction is made use of through the principle of my device for preventing anti-clockwise rotation of the crank shaft and shaft 3.

The casing which encloses the braking device is supported by brackets 12 from transverse bars 12ª located beneath the floor boards 13, the bars being connected to the chassis frame of the automobile. The interior of the casing 4 is provided with a central longitudinal bore 14 which merges into a bore 15 of larger diameter than the bore 14 which in turn merges into a bore 16 of larger diameter than the bore 15. Mounted within the bore 16 and in engagement with the shoulder 17 formed between the bores 15 and 16 is a ball bearing 18. A portion of the race of the ball bearing 18 is formed by the inner face 19 of a disc 20 and an annular flange 21 projecting inwardly from the inner face of the disc 20. A cone-shaped member 22 is integrally formed with the disc 20 and which connects an externally threaded sleeve 23 to the disc 20. The disc 20, cone 22 and sleeve 23 are provided with a longitudinally central passage through which the shaft 3 is inserted. A key 24 locks the disk 20 and likewise the sleeve 23 to the shaft 3.

An internally threaded sleeve 25 is mounted on the sleeve 23 and having its internal threads adapted to cooperate with the external threads on the sleeve 23 for moving the sleeve 25 towards the left and compressing the coil spring 26. Said spring surrounds the outer end of sleeve 25 and has its outer end in engagement with the annular flange 21. The inner end of the spring is depressed and forming a lug which rides in a groove 27 formed longitudinally of said sleeve. The other end of the sleeve 25 is developed into a cone-shaped member 28 having an inner gripping face adapted to engage at times the outer grooved face 29 of the frusto-conically shaped member 30.

The gripping face 31 of the conical member 28 and the gripping face 29 of the member 30 are adapted normally to be out of contact with each other. The cone-shaped member has a central bore which receives the shaft 3 whereby said member is slidable on the shaft and projecting from one face are a plurality of dogs 32 which are movable into engagement with the pivoted clutch actuating member 33 when the rear wheels of the automobile have a tendency to reverse or drive the shaft 3 in an anti-clockwise direction. Four dogs are shown and likewise four of the members 33 so that each actuating member 33 controls the movement of a pivoted clutch 34 projecting through perforations in a plurality of discs 35. These discs have a central passage through which the dogs 32 are adapted to project and through which the shaft 3 is inserted. When the members 33 are moved radially outward from the center they engage and force the clutching member 34 into gripping contact with the inner wall 42 of the casing 4.

The disc 10 which forms the closure for the inner end of the casing of the braking device is provided with a plurality of openings 36 through which are adapted to project lugs 37 formed upon the outer face of a disc 38 which is adapted to be rigidly connected with the discs 35. It will be seen that the shaft 3 adjacent the hub 9 of the disc 10 is threaded to receive the internal threads of the said hub. A set screw 39 is adapted to lock the hub and likewise the disc against accidental rotation on the shaft and whereby the disc and shaft are simultaneously rotated.

It will be noted that the end of the casing 4 adjacent the closure disc 10 is provided with a plurality of bores of varying diameters which receive the frusto-conically shaped member 30, the ball bearings 40 and the clutch discs 35. The outer end of the casing 4 abuts a sleeve 41 on the transmission casing where the shaft 3 enters the transmission casing whereby the disc 20 is maintained against longitudinal movement along the shaft.

The operation of my device is as follows:
When the automobile provided with my improved braking device, is ascending a hill and the automobile is stalled, the same will be prevented from running backward down the hill. The rearward running of the automobile will cause anti-clockwise rotation of shaft 3 and cause the sleeve 25 to be moved towards the disc 10 since the sleeve 23 will be rotated with the shaft. The construction of the cooperating threads of the sleeves 23 and 25 is such that anti-clockwise rotation of the sleeve 23 will cause the sleeve 25 to be moved to the right and force the gripping face 31 of the member 28 to engage the gripping face 29 of the member 30 and force the member 30 to the right whereby the dogs 32 are thrown into rigid engagement with the actuating member 33 of the clutch elements 34. The tendency to rotate the member 30 will, as has been described, actuate the clutch elements 34 and force them into engagement with the inner wall 42 of the right end of the casing 4 and prevent further rotation of the member 30, the rotation of the sleeve 25, rotation of sleeve 23 and likewise shaft 3 so that the shaft will be maintained against rotation and the car will be prevented from rearward travel.

It will be seen that although the braking device will prevent rearward movement of the car when on a hill, it will permit the engine, through the crank shaft and shaft 3, to drive the automobile rearwardly without any interference from the automatic braking device since the shaft 3 is rotated clockwise at all times regardless of the fact that the automobile is being driven backwardly or forwardly.

Furthermore, since the braking device prevents the shaft from being rotated anti-clockwise it will prevent the shaft being rotated anti-clockwise when the engine backfires and therefore prevent injury to a person cranking the automobile.

What I claim is:

1. In combination with an internal combustion engine having a transmission casing, a drive shaft adapted to be rotated clockwise, a clutch means on the drive shaft permitting clockwise rotation of the drive shaft but preventing anti-clockwise rotation of said shaft and comprising a casing rigidly fixed against movement, a pair of telescoping members having inter-engaging means mounted on the shaft within the clutch casing, one of the telescoping members being keyed to the shaft, the other telescoping member caused to be moved longitudinally of the shaft within the clutch casing, by the interengaging of the telescoping member when the shaft is rotated anti-clockwise, and a clutch member actuated by the movable telescoping means for causing said clutch to grip the inner wall of the casing thereby locking the telescoping member and likewise the shaft to the clutch casing when the drive shaft is rotated anti-clockwise.

2. In combination with an internal combustion engine having a transmission casing, a drive shaft adapted to be rotated clockwise, a clutch means on the drive shaft permitting clockwise rotation of the drive shaft but preventing anti-clockwise rotation of said shaft, and comprising a casing rigidly fixed against movement, a pair of telescoping sleeves, the inner sleeve being keyed to the drive shaft and rotated with the drive shaft within the casing and provided with external threads, a second sleeve provided with internal threads adapted to engage the threads on the rigid sleeve for moving the outer sleeve longitudinally of the shaft and within the casing, spring means tending to maintain the outer sleeve outwardly from the inner sleeve, and means adapted to be actuated by the movable sleeve and caused to be locked to the clutch casing for preventing anti-clockwise rotation of the inner and outer sleeves and the shaft, the clockwise rotation of the shaft causing the interengaging threads of the inner and outer sleeves to move the outer sleeve in telescoping relation with the inner sleeve and compress the spring.

3. In combination with an internal combustion engine having a transmission casing, a drive shaft adapted to be rotated clockwise, a clutch means on the drive shaft permitting clockwise rotation of the drive shaft and preventing anti-clockwise rotation of said shaft and comprising a casing rigidly fixed against movement, a disc closing one end of the casing, an externally threaded sleeve integrally formed with the disc, the drive shaft passing through the center of the disc and said sleeve, a second sleeve having internal threads and telescoping the first mentioned sleeve and adapted to be shifted longitudinally of the shaft and out of and in telescoping relation by the rotation of the drive shaft, the first mentioned or inner sleeve being keyed to the drive shaft, a spring having one end abutting the disc and its other end loosely connected with the slidable sleeve, a clutch member slidable on the shaft and having one end adapted to be gripped by the slidable sleeve when said sleeve is moving out of telescoping relation with the inner sleeve, and means having gripping jaws adapted to be forced into gripping relation with the inner wall of the casing and operated by the clutch means when the shaft is rotated anti-clockwise for preventing rotation of the sleeves and the drive shaft, said spring being adapted to normally urge the sleeves into clutching relation with the clutch member.

ABRAHAM ISAAC KAPLON.